United States Patent [19]
Bauer et al.

[11] Patent Number: 5,671,949
[45] Date of Patent: Sep. 30, 1997

[54] SEAT BELT PRETENSIONER

[75] Inventors: Barney J. Bauer, Fenton; Charles M. Hotary, Romeo, both of Mich.

[73] Assignee: TRW Vehicle Safety Systems Inc., Lyndhurst, Ohio

[21] Appl. No.: 575,836

[22] Filed: Dec. 20, 1995

[51] Int. Cl.⁶ .................................................. B60R 22/46
[52] U.S. Cl. ...................................... 280/806; 297/480
[58] Field of Search ........................... 280/806; 297/480; 60/632, 635, 256

[56] References Cited

U.S. PATENT DOCUMENTS

| | | | |
|---|---|---|---|
| 3,871,470 | 3/1975 | Schwanz et al. | 297/480 |
| 3,871,683 | 3/1975 | Otani | 280/806 |
| 4,288,098 | 9/1981 | Tsuge et al. | 280/806 |
| 4,385,775 | 5/1983 | Shimogawa et al. | 280/806 |
| 4,422,669 | 12/1983 | Chiba et al. | 297/480 X |
| 5,104,193 | 4/1992 | Fohl | 280/806 |
| 5,310,219 | 5/1994 | Fohl | 297/480 |
| 5,310,220 | 5/1994 | Fohl | 280/806 |
| 5,366,245 | 11/1994 | Lane, Jr. | 280/806 |
| 5,403,037 | 4/1995 | Fohl | 280/806 |
| 5,411,291 | 5/1995 | Föhl | 280/806 |
| 5,519,997 | 5/1996 | Specht | 60/632 |

FOREIGN PATENT DOCUMENTS

| | | | |
|---|---|---|---|
| 0614789 | 9/1994 | European Pat. Off. | 280/806 |
| 4005148 | 1/1992 | Japan | 280/806 |

Primary Examiner—Christopher P. Ellis
Attorney, Agent, or Firm—Tarolli, Sundheim, Covell, Tummino & Szabo

[57] ABSTRACT

An apparatus (20, 220, 420) for tensioning a vehicle seat belt and tightening the seat belt against a vehicle occupant comprising a buckle (22) which is connectable with a tongue of a seat belt. An anchor (80, 280, 444) is connectable with a part of a vehicle. A tubular housing (42, 242, 442) is fixed to one of the buckle (22) and the anchor (80, 280, 444), has a rectangular inner periphery taken in a plane extending normal to a longitudinal axis (B) of the housing, and includes a first wall (64, 264, 446). A second wall (84, 284, 484) is fixed to the other of the buckle (22) and the anchor (80, 280, 444), has a rectangular outer periphery taken in the plane, and is received in the housing (42, 242, 442) opposite the first wall (64, 264, 446) to at least partially define a chamber (102, 302, 502) which is expansible. A connector (82, 282, 482) is fixed to the second wall (84, 284, 484) and to the other of the buckle (22) and the anchor (80, 280, 444). The connector (82, 282, 482) extends through the first wall (64, 264, 446). Actuatable means (66, 266, 488) is in fluid communication with the chamber (102, 302, 502) and applies a force, upon actuation, against the first wall (64, 264, 446) and the second wall (84, 284, 484) to expand the chamber (102, 302, 502) to tension the seat belt and tighten the seat belt against the occupant.

29 Claims, 6 Drawing Sheets

SEAT BELT PRETENSIONER

BACKGROUND OF THE INVENTION

1. Technical Field

The present invention relates to an apparatus for tensioning a vehicle seat belt, and particularly to a seat belt pretensioner which is connectable to a seat belt buckle.

2. Description of the Prior Art

Seat belt pretensioners are known. The known pretensioners are actuatable to tension a seat belt and tighten the seat belt against a vehicle occupant. One known pretensioner is connected with a seat belt buckle. The buckle is connectable with a tongue carried by seat belt webbing. The pretensioner is actuatable to move the buckle in a direction which tensions the seat belt and tightens the seat belt against a vehicle occupant.

The known pretensioner includes a cylinder fixed to the vehicle. A piston is located in the cylinder and moves in the cylinder. The piston is fixed to a first end of a cable. The cable has a second end fixed to the buckle. The second end of the cable extends at an angle relative to the direction of movement of the piston in the cylinder.

An actuatable igniter is located adjacent the cylinder. Upon actuation of the igniter, the piston moves in the cylinder and pulls the first end of the cable in one direction. The second end of the cable pulls the buckle in a direction which is angled relative to the direction of movement of the first end of the cable to tension the seat belt and tighten the seat belt against the occupant.

SUMMARY OF THE INVENTION

The present invention is directed to an apparatus for tensioning a vehicle seat belt and tightening the seat belt against a vehicle occupant. The apparatus comprises a buckle which is connectable with a tongue of the seat belt. An anchor is connectable to a part of the vehicle. A housing is fixed to one of the buckle and the anchor. The housing includes a first wall. A second wall is received in the housing opposite the first wall to at least partially define a chamber in the housing which is expansible. A connector is fixed to the second wall and to the other of the buckle and the anchor. The connector extends through the first wall. Actuatable means is in fluid communication with the chamber for directing, upon actuation, a fluid pressure force against the first wall and the second wall. The force expands the chamber and provides relative movement between the housing and the second wall to tension the seat belt and tighten the seat belt against the occupant.

The second wall and the chamber each preferably have a rectangular periphery taken in a direction which extends normal to a longitudinal axis of the housing. A gasket is fixed to the second wall and engages the housing to inhibit fluid flow between the housing and the second wall.

In one embodiment, the second wall is fixed to the anchor. The actuatable means is fixed to the housing and is movable with the housing relative to the anchor and the second wall. In another embodiment, the housing is fixed to the anchor and the second wall is fixed to the buckle. The actuatable means is fixed to the second wall and is movable relative to the anchor and the housing.

BRIEF DESCRIPTION OF THE DRAWINGS

Further features and advantages of the present invention will become apparent to those skilled in the art to which the present invention relates from reading the following specification with reference to the accompanying drawings, in which.

DESCRIPTION OF PREFERRED EMBODIMENTS

A vehicle occupant seat belt system includes a buckle assembly 20 (FIG. 1) and seat belt webbing (not shown). The buckle assembly 20 is attached to a component of the vehicle, such as a seat, door, floor or door pillar. The seat belt webbing is extendable about an occupant of a vehicle seat. The seat belt webbing carries a tongue (not shown) which is connectable with the buckle assembly 20 to secure the seat belt webbing about the occupant.

Figure 1:
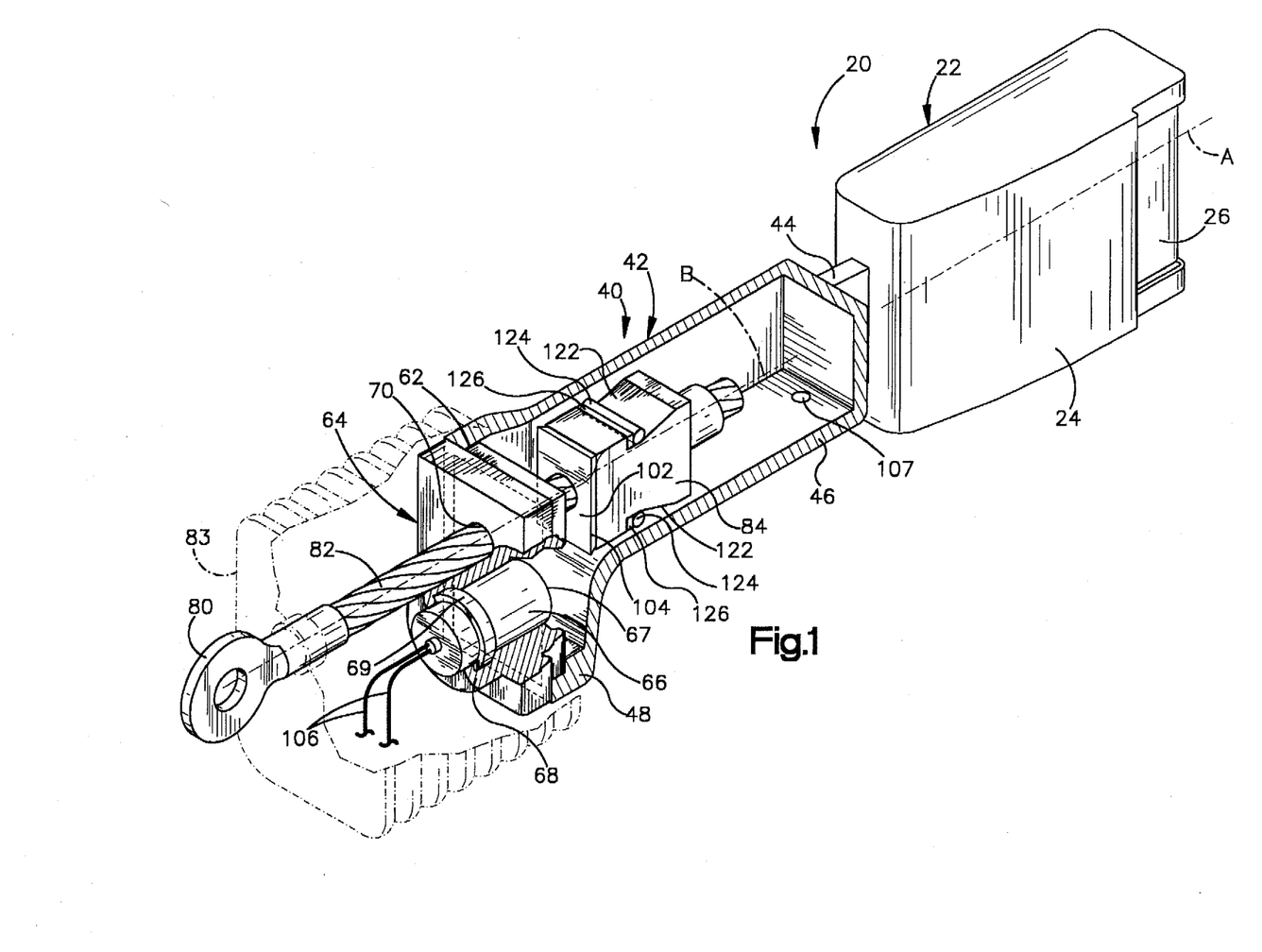
FIG. 1 is a schematic perspective view of a buckle assembly for a vehicle seat belt system including a pretensioner, according to one embodiment of the present invention.

The buckle assembly 20 includes a buckle 22 having a cover 24, a movable pushbutton 26 extending through the cover, and a longitudinal axis A. The buckle 22 receives and latches the tongue to connect together the seat belt webbing and the buckle assembly 20. The buckle 22 is actuatable to release the tongue when the pushbutton 26 is manually depressed.

The buckle assembly 20 also includes a pretensioner 40, constructed according to one embodiment of the present invention. The pretensioner 40 is operatively connected with the buckle 22. The pretensioner 40 is automatically actuatable to tension the seat belt and tighten the seat belt against the occupant in response to an event that requires tensioning of the seat belt and tightening the seat belt against the occupant.

The pretensioner 40 includes a hollow housing 42 (FIGS. 1–4) which is fixed to the buckle 22 by a connector 44. The connector 44 may be of any suitable length and extends in a direction substantially parallel to the axis A of the buckle 22. The housing 42 and the connector 44 are preferably made as one piece of metal, such as by die casting. The housing 42 has a longitudinal axis B which is substantially coaxial with the axis A of the buckle 22. The housing 42 includes a tube portion 46 which has a rectangular inner periphery, in a plane extending normal to the axis B.

The housing 42 also includes an enlarged end portion 48 extending from the tube portion 46. The tube portion 46 is in fluid communication with the enlarged end portion 48. The enlarged end portion 48 has an opening 62 to the left, as viewed in FIGS. 2–4. A first end wall or cap 64 is fixed in the opening 62 of the enlarged end portion 48 by suitable means, such as a weld or an adhesive. The cap 64 is preferably made from metal and supports an actuatable igniter 66. The igniter 66 has an end surface 67 located in the enlarged end portion 48 of the housing 42. An end portion 68 of the cap 64 is deformed over a flange 69 of the igniter 66 to retain the igniter in the cap. A circular opening 70 extends through the end cap 64 around the axis B of the housing 42.

Figure 2:
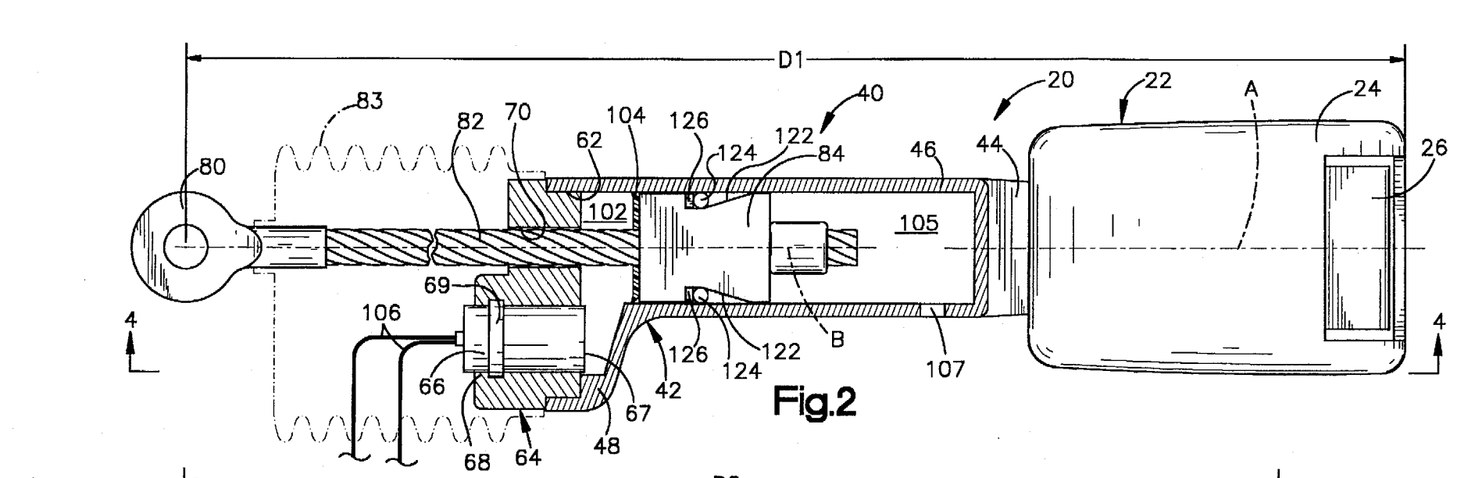
FIG. 2 is a sectional view of the buckle assembly of FIG. 1.
Figure 3:
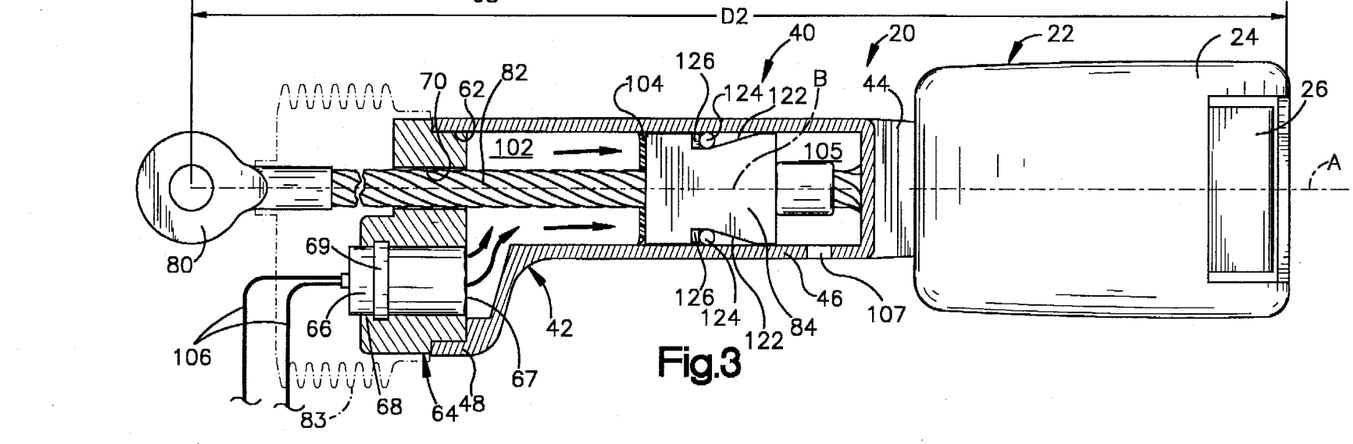
FIG. 3 is a view similar to FIG. 2 with parts illustrated in different positions.
Figure 4:
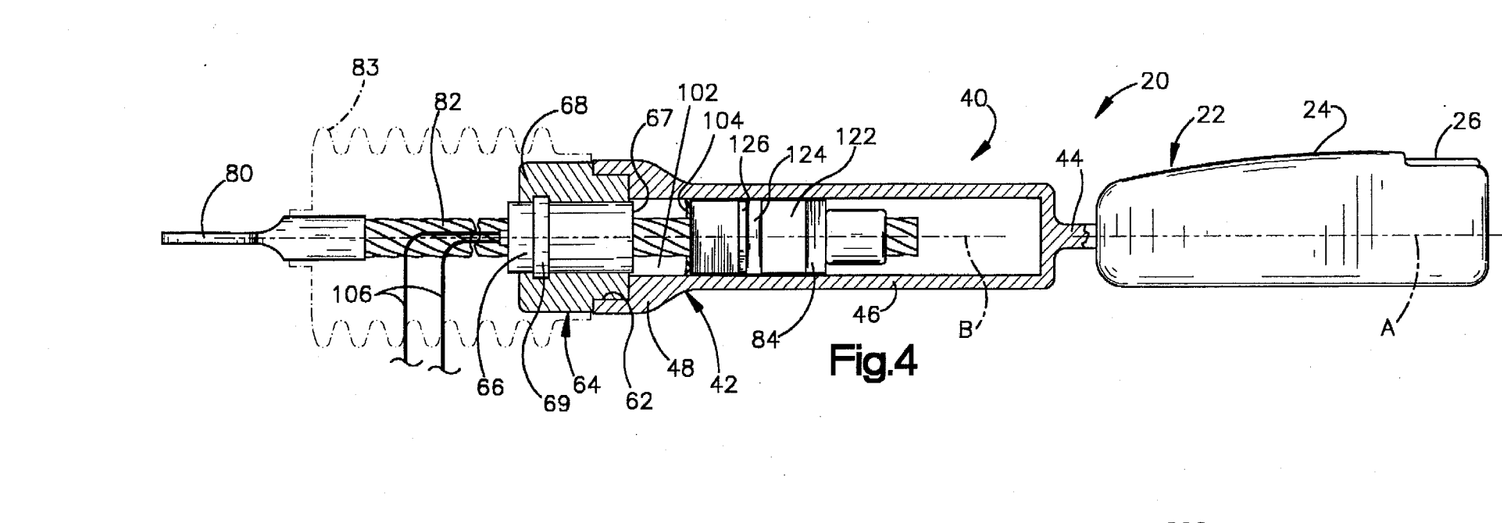
FIG. 4 is a sectional view of the buckle assembly of FIG. 2, taken approximately along the line 4—4 in FIG. 2.

An anchor 80 is secured to the component of the vehicle by a suitable fastener, such as a bolt. A connector or cable 82 is fixed at one end to the anchor 80. The cable 82 is substantially inextendable in a direction along its length, measured in a direction parallel to the axis B, but is somewhat flexible in a direction transverse to its length. The cable 82 extends through the opening 70 in the cap 64. The outer diameter of the cable 82 fits tightly in the opening 70, and the cable forms a seal against the surface of the cap 64 defining the opening 70. It will be appreciated that a resilient seal could be provided in or at the opening 70 to engage the exterior of the cable 82. A bellows 83 is provided at the enlarged end portion 48 of the housing 42 to inhibit access to the cable 82, the igniter 66, and the enlarged end of the housing. The buckle 22 is initially spaced from the anchor 80 a distance D1 prior to actuation of the pretensioner 40.

An end of the cable 82 opposite the end connected to the anchor 80 is connected to a second end wall or piston 84. The piston 84 is located in the tube portion 46 of the housing 42. The piston 84 has a rectangular outer periphery, in a plane extending normal to the axis B of the housing 42, and closely fits within the tube portion 46 of the housing. The piston 84 cooperates with the housing 42 and the cap 64 to define an expansible chamber 102. A rectangular elastomeric gasket 104 is fixed to the piston 84 and engages the inner periphery of the tube portion 46. The gasket 104 inhibits fluid flow between the piston 84 and the surfaces defining the tube portion 46 of the housing 42.

The piston 84 and gasket 104 also cooperate with the tube portion 46 of the housing 42 to define a contractible chamber 105 on a side of the piston opposite the expansible chamber 102. A vent opening 107 is provided in the tube portion 46 of the housing 42. The vent opening 107 fluidly communicates the contractible chamber 105 with the environment external to the housing 42. Such fluid communication assures that fluid damping does not occur during movement of the piston 84 relative to the housing 42 when the chamber 102 expands.

The end surface 67 of the igniter 66 is located in the chamber 102. The igniter 66 is actuated by an electrical signal communicated over wires 106. The igniter 66, upon actuation, produces combustion products. The combustion products flow from the igniter 66 into the chamber 102 in the enlarged end portion 48 of the housing 42. The pressure of the combustion products in the chamber 102 applies a force to surfaces of the piston 84, tube portion 46 of the housing 42, enlarged end portion 48 of the housing, and cap 64, all of which define the chamber.

The force expands the chamber 102 to move the housing 42, the cap 64 and the igniter 66 linearly to the left, as viewed in FIGS. 2–4, relative to the piston 84, the cable 82 and the anchor 80 and in a direction along the axis A of the buckle 22. The chamber 105 contracts concurrently with expansion of the chamber 102. Fluid in the chamber 105 escapes through the vent opening 107 in the housing 42 upon contraction of the chamber when the piston 84 moves within the housing. Movement of the housing 42 to the left pulls the connector 44 and the buckle 22 in a direction towards the anchor 80 to tension the seat belt and tighten the seat belt against the occupant. The buckle 22 moves closer to the anchor 80 in a direction along the axis B of the housing 22, from the distance D1 (FIG. 2) to the distance D2 (FIG. 3).

The piston 84 has a pair of recesses 122 formed in opposite sides of the piston. Each recess 122 has a planar surface which extends at a relatively small angle relative to the axis B of the housing 42. A roller 124 and a resilient biasing gasket 126 are located in each recess 122. The rollers 124 and recesses 122 act on the tube portion 46 of the housing 42 to inhibit contraction of the chamber 102 but not expansion of the chamber, as will be explained.

When the chamber 102 expands, the housing 42 moves to the left relative to the piston 84, as viewed in FIGS. 2–4. The rollers 124 are forced against and compress the gaskets 126 by friction of opposite walls of the tube portion 46 of the housing 42 moving relative to the piston 84. When the tube portion 46 of the housing 42 stops moving relative to the piston 84, the resiliency of the biasing gaskets 126 urge the rollers 124 outward relative to the axis B along the planar surfaces defining the recesses 122. The rollers 124 wedge between the opposite walls of the tube portion 46 and the planar surfaces of the recesses 122 of the piston 84. The rollers 124 thus inhibit the housing 42 from moving to the right relative to the piston 84, as viewed in FIGS. 2–4, and thus inhibit contraction of the chamber 102.

Figure 5:
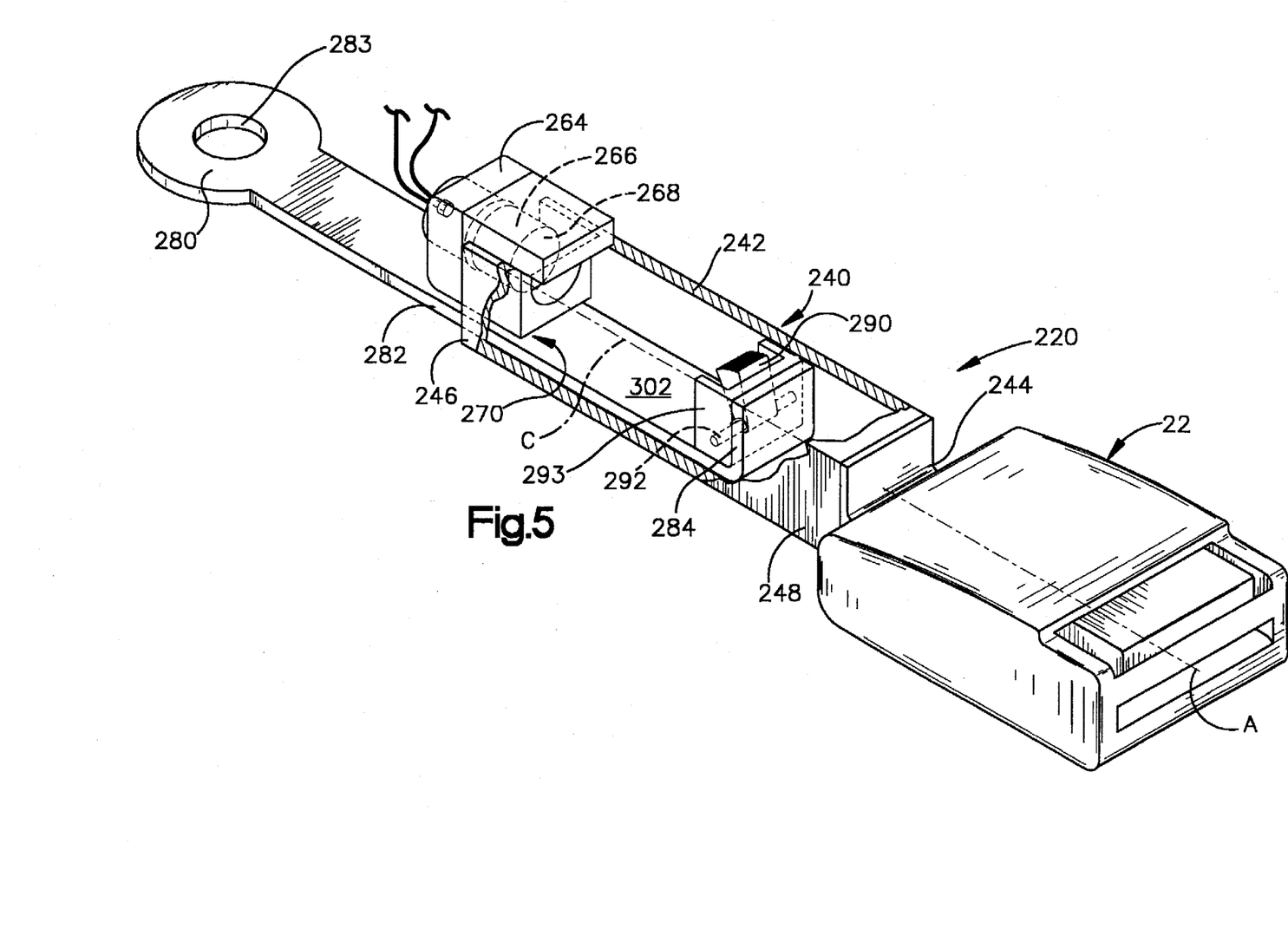
FIG. 5 is a schematic perspective view of a buckle assembly including a pretensioner, according to another embodiment of the present invention.

Another buckle assembly 220 (FIGS. 5 and 6) includes the buckle 22, illustrated in FIGS. 1–4 and described above, and a pretensioner 240, constructed according to another embodiment of the present invention. The pretensioner 240 is actuatable to tension the seat belt and tighten the seat belt against the occupant in response to an event that requires tensioning of the seat belt and tightening the seat belt against the occupant.

Figure 6:
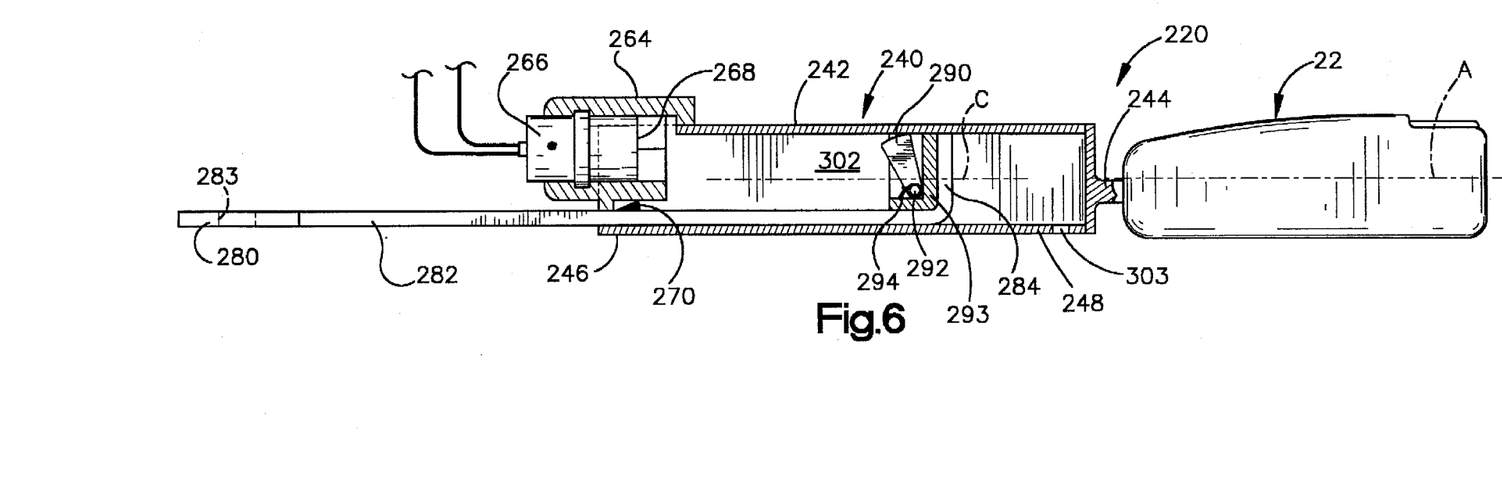
FIG. 6 is a sectional view of the buckle assembly of FIG. 5.

The pretensioner 240 includes a metal tubular housing 242 fixed to the buckle 22 by a metal connector 244. The housing 242 has a longitudinal axis C which extends coaxially with the axis A of the buckle 22. The housing 242 has a rectangular inner periphery, in a plane extending normal to the axis C of the housing. The left end portion 246 of the housing 242, as viewed in FIG. 6, is open, while the right end portion 248 is closed.

A first wall or metal cap 264 is fixed to the left end portion 246 of the housing 242 to substantially close the left end portion. The cap 264 supports an actuatable igniter 266. A slot 270 is formed between the cap 264 and a lower wall of the housing 242, as viewed in FIG. 6.

Extending through the slot 270 at the cap 264 is a connector or intermediate plate portion 282 of a one piece, flat element that also includes an anchor 280 at one end of the intermediate plate portion and a second wall or end member 284 at the other end of the intermediate plate portion. The anchor 280 is generally circular with a central opening 283. The anchor 280 is attachable to a component of the vehicle by a suitable fastener, such as a bolt, which extends through the opening 283. It will be apparent that the anchor 280 could be attached to the vehicle component in a manner which allows rotation of the anchor about the center of the opening 283 in the anchor.

The intermediate plate portion 282, which is preferably coplanar with the anchor 280, is substantially inextendable in a direction along its length, measured in a direction parallel to the axis C, and is relatively rigid in a direction transverse to its length. The intermediate plate portion 282 fits tightly within the slot 270 so relatively little fluid flow or leakage can occur between the housing 242, the intermediate plate portion, and the cap 264. It will be apparent that the intermediate plate portion 282 and the anchor 280 could be disposed at an angle to one another or could be formed from separate parts that are subsequently fixed together.

The end member 284 extends in a direction substantially normal to the extent of the intermediate plate portion. The end member 284 is located in the housing 242 and has a rectangular outer periphery, in a plane extending normal to the axis C of the housing 242.

The housing 242, the cap 264, the end member 284, and the intermediate plate portion 282 cooperate to define an expansible chamber 302. The chamber 302 is expandable in a direction parallel to the axis A of the buckle 22. Specifically, the housing 242 and the cap 264 are movable linearly on the axis A of the buckle 22 relative to the end member 284, intermediate plate portion 282, and anchor 280. It will be apparent that the closed right end portion 248 of the housing 242, as viewed in FIG. 6, could be provided with at least one pressure relief or vent opening 303. The vent opening 303 would allow any fluid in the housing 242 to the right of the end member 284, as viewed in FIG. 6, to exit the housing during movement of the end second wall to the right. The pressure relief opening would assure that little or no fluid damping of the end member 284 occurs during expansion of the chamber 302.

The igniter 266 has an end 268 in fluid communication with the expansible chamber 302. The igniter 266, upon actuation, produces combustion products. The combustion products flow from the igniter 266 into the chamber 302. The pressure of the combustion products in the chamber 302 applies a force to the surfaces of the end member 284, cap 264 and housing 242 to expand the chamber. Expansion of the chamber 302 forces the housing 242, the end cap 264 and the igniter 266 to move to the left, as viewed in FIGS. 5–6, relative to the end member 284, intermediate plate portion 282 and anchor 280. The housing 242 pulls the buckle 22 in a direction towards the anchor 280 for tensioning the seat belt and tightening of the seat belt against the occupant.

The end member 284 and intermediate plate portion 282 carry a structure 322 for inhibiting contraction of the chamber 302. The structure 322 includes a pawl 290 that is supported for pivotal movement on a shaft 292 in a mounting 293. The mounting 293 is fixed to the intermediate plate portion 282 and the end member 284. The pawl 290 is biased by a spring 294 to pivot in a clockwise direction, as viewed in FIG. 6.

During expansion of the chamber 302, the pawl 290 pivots in a counterclockwise direction as a result of movement of the housing 242 to the left relative to the end member 284. When the housing 242 stops moving relative to the end member 284, the pawl 290 pivots in a clockwise direction under the bias of the spring 294 and wedges against the upper wall of the housing, as viewed in FIG. 6. Wedging of the pawl 290 against the housing 242 inhibits the housing from moving to the right relative to the end member 284 and contracting the chamber 302 due to a force applied to the seat belt by the occupant.

Another buckle assembly 420 (FIGS. 7–8) includes the buckle 22, illustrated in FIGS. 1–6 and described above. The buckle assembly 420 also includes a pretensioner 440, constructed according to yet another embodiment of the present invention. The pretensioner 440 is actuatable to tension the seat belt and tighten the seat belt against the occupant in response to an event that requires tensioning of the seat belt and tightening the seat belt against the occupant.

Figure 7:
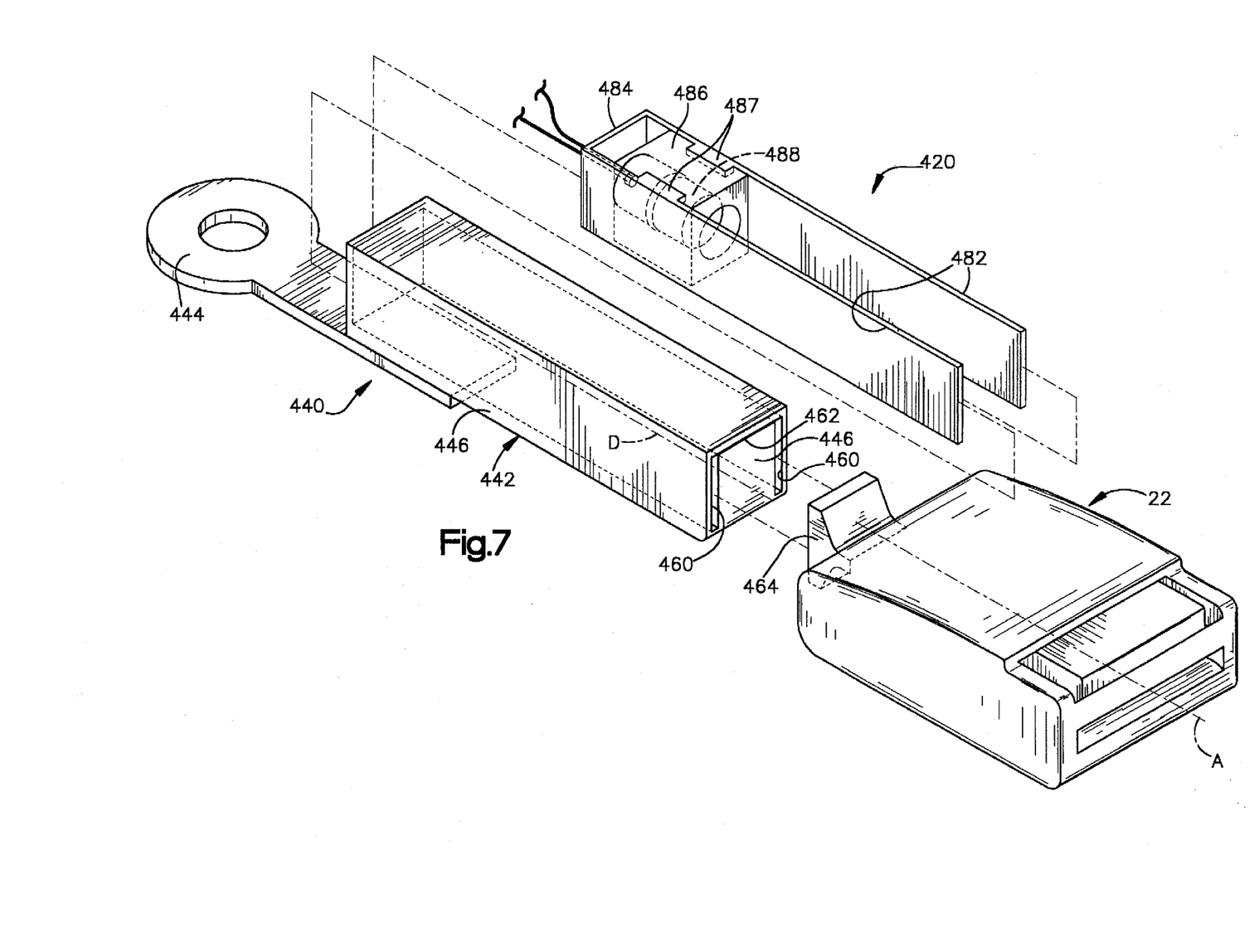
FIG. 7 is a schematic perspective view of a buckle assembly including a pretensioner, according to yet another embodiment of the present invention.
Figures 8, 9:
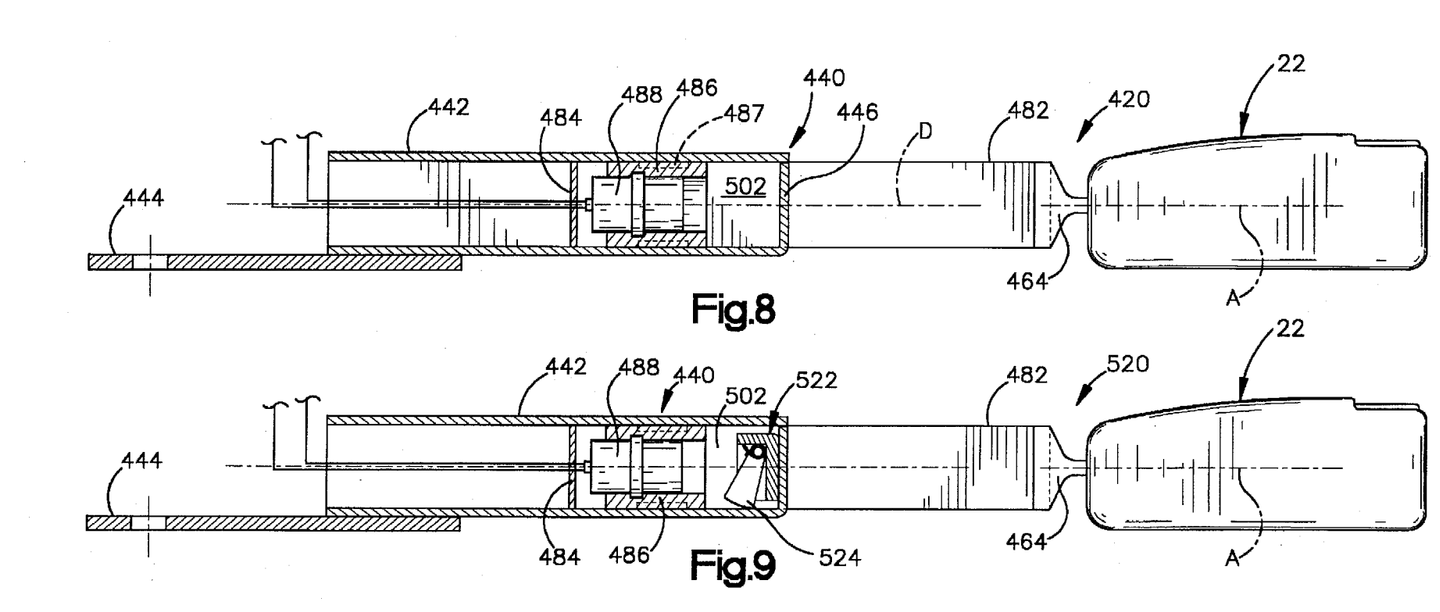
FIG. 8 is a sectional view of the buckle assembly of FIG. 7.
FIG. 9 is a sectional view of a buckle assembly including a modified version of the pretensioner illustrated in FIG. 8.

The pretensioner 440 includes a metal tubular housing 442 having a longitudinal axis D which extends coaxially with the axis A of the buckle 22. The housing 442 is connected to an anchor 444 by suitable means, such as a weld. The anchor 444 is secured to a component of the vehicle by a suitable fastener, such as a bolt.

The housing 442 has a rectangular inner periphery, in a plane extending normal to the axis D of the housing. The left end of the housing 442, as viewed in FIG. 8, is open. A first wall or end plate 446 is fixed to the housing 442 to close partially the right end of the housing and define a pair of parallel but spaced apart slots 460 (FIG. 7). The end plate 446 is a bent portion of the lower wall of the housing 442, as viewed in FIGS. 7 and 8. The end plate 446 is fixed to the upper wall, such as by a weld 462.

A mounting 464 is fixed to the buckle 22. The mounting 464 is fixed at its left end to the right ends of a pair of connectors or intermediate plates 482. The intermediate plates 482 are connected together at their left ends by a second wall or end member 484. Each of the intermediate plates 482 extends through a respective one of the slots 460 at the end plate 446 in the housing 442 and closely fits within the slot. The end member 484 is received in and movable relative to the housing 442 on the axis D of the housing and on the axis A of the buckle 22.

The end member 484 has a rectangular outer periphery, in a plane extending normal to the axis D of the housing 442. The end member 484 cooperates with the housing 442 and the end plate 446 to define an expansible chamber 502. The end member 484 defines a movable left end of the expansible chamber 502.

A block 486 is fixed between the intermediate plates 482 by tangs 487 on the intermediate plates to support an actuatable igniter 488. The igniter 488 has an end in fluid communication with the expansible chamber 502. Upon actuation of the igniter 488, combustion products are produced. The combustion products flow from the igniter 488 into the chamber 502. The pressure of the combustion products in the chamber 502 applies a force to the surfaces of the end member 484, end plate 446 and walls of the housing 442 to expand the chamber.

The force of the pressure of the combustion products moves the end member 484 relative to the housing 442 to the left, as viewed in FIG. 8. The igniter 488 is movable with the end member 484 and intermediate plates 482 relative to the anchor 444 and the housing 442. The end member 484 and intermediate plates 482 pull the buckle 22 in a direction toward the anchor 444 for tensioning the seat belt and tightening the seat belt against the occupant.

It will be apparent that the pretensioner 440 could be modified so the end member 484 carries the igniter 488. The block 486 could thus be eliminated entirely. The block 486 could also be fixed to the intermediate plates 482 so the block defines a left end of the expansible chamber 502 which is movable relative to the housing 442. The end member 484 could thus be eliminated.

A modified version of the buckle assembly 420, illustrated in FIGS. 7 and 8, is illustrated in FIG. 9 as a buckle assembly 520. The buckle assembly 520 includes the buckle assembly 420 in its entirety. The buckle assembly 520 also includes a structure 522 in the pretensioner 440 for inhibiting contraction of the chamber 502. The structure 522 is similar to the structure 322 illustrated in FIG. 6 and described above.

The structure 522 does not inhibit movement of the intermediate plates 482 and end member 484 to the left relative to the housing 442, as viewed in FIG. 9. The structure 522 inhibits movement of the intermediate plates 482 and end member 484 to the right relative to the housing 442. The structure 522 includes a pawl 524 which is pivotable about a shaft that is fixed to both of the intermediate plates 482. The structure 522 is movable with the intermediate plates 482 relative to the housing 442. When the intermediate plates 482 and end member 484 attempt to move to the right relative to the housing 442, the pawl 524 engages the lower wall of the housing, as viewed in FIG. 9. Movement of the end member 484 and intermediate plates 482 to the right relative to the housing 442 is inhibited by the pawl 524 wedging against the lower wall of the housing.

Figure 10:
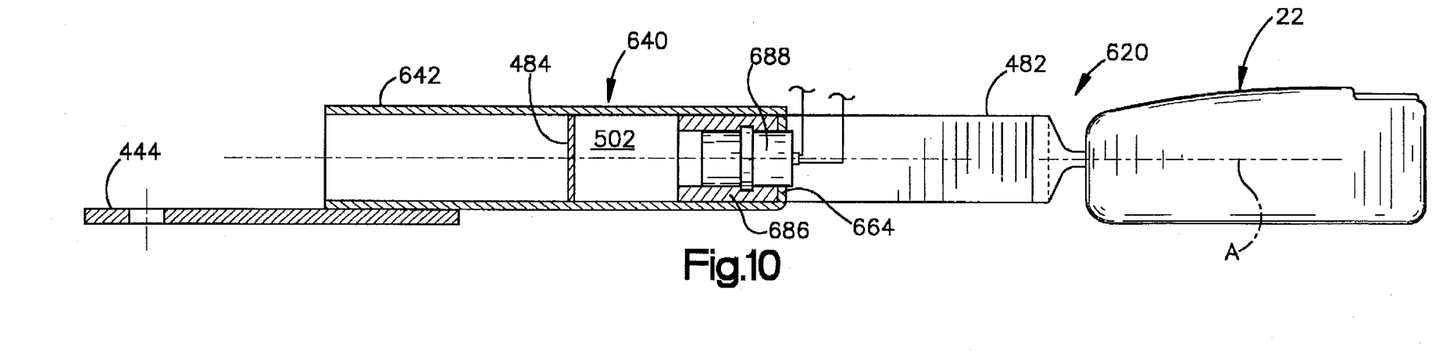
FIG. 10 is a sectional view of a buckle assembly including another modified version of a pretensioner.

FIG. 10 illustrates yet another buckle assembly 620. The buckle assembly 620 is similar to the buckle assembly 420, illustrated in FIGS. 7 and 8 and described above. The buckle assembly 620 is a modified version of the buckle assembly 420.

The buckle assembly 620 includes the buckle 22 and a pretensioner 640. The pretensioner 640 has an actuatable igniter 688 which is carried in an end plate 664 of a housing 642. The igniter 688 is located between the intermediate plates 482. Upon actuation of the igniter 688, the end member 484 and intermediate plates 482 move to the left relative to the housing 642, as viewed in FIG. 10. The igniter 688 does not move relative to the anchor 444 and housing 642.

From the above description of the invention, those skilled in the art will perceive improvements, changes and modifications. For example, the housing could be attached to either the buckle or the anchor and the end member or piston could be attached to either the anchor or buckle. Such improvements, changes and modifications within the skill of the art are intended to be covered by the appended claims.

Having described the invention, the following is claimed:

1. An apparatus for tensioning a vehicle seat belt and tightening the seat belt against a vehicle occupant, said apparatus comprising:

a buckle connectable with a tongue of a seat belt;

an anchor connectable with a part of a vehicle;

a housing fixed to said buckle, said housing including a first wall and a longitudinal axis;

a second wall in said housing and cooperating with said first wall to define opposite ends of an expansible chamber, said second wall being movable relative to said first wall in a first direction along the axis, said second wall being connected with said anchor;

a connector fixed to said second wall and said buckle and said anchor, said connector extending through said first wall; and actuatable means carried by one of said first and second walls and in fluid communication with the expansible chamber for applying, upon actuation, a fluid pressure force against said first and second walls to expand said expansible chamber for moving said buckle in the first direction along the axis to tension the seat belt and tighten the seat belt against the occupant;

said housing and said first wall being movable relative to said second wall in response to actuation of said actuatable means.

2. An apparatus for tensioning a vehicle seat belt and tightening the seat belt against a vehicle occupant, said apparatus comprising:

a buckle connectable with a tongue of a seat belt;

an anchor connectable with a part of a vehicle;

a housing fixed to said anchor, said housing including a first wall and a longitudinal axis;

a second wall in said housing and cooperating with said first wall to define opposite ends of an expansible chamber, said second wall being movable relative to said first wall in a first direction along the axis;

a connector fixed to said second wall and to said buckle, said connector extending through said first wall; and actuatable means carried by one of said first and second walls and in fluid communication with the expansible chamber for applying, upon actuation, a fluid pressure force against said first and second walls to expand said expansible chamber for moving said buckle in the first direction along the axis to tension the seat belt and tighten the seat belt against the occupant;

said second wall being connected with said buckle by said connector, said second wall being movable relative to said housing and said first wall in response to actuation of said actuatable means;

said actuatable means being fixed to said second wall, said actuatable means being movable with said second wall relative to said first wall.

3. The apparatus of claim 1 wherein said housing is tubular and has a rectangular inner periphery taken in a plane extending normal to a longitudinal axis of said housing and said second wall has a rectangular outer periphery taken in the plane.

4. The apparatus of claim 1 wherein said actuatable means is fixed to said first wall and moves with said first wall relative to said second wall.

5. The apparatus of claim 2 wherein said actuatable means is fixed to said first wall.

6. The apparatus of claim 2 further including a gasket fixed to said second wall for engaging said housing to seal the chamber.

7. The apparatus of claim 2 further including means for inhibiting contraction of the expansible chamber after expansion of the expansible chamber.

8. The apparatus of claim 7 wherein said inhibiting means is located in the chamber.

9. The apparatus of claim 2 wherein said second wall and said housing cooperate to define a contractible chamber on a side of said second wall opposite said expansible chamber and further including an opening through said housing to vent said contractible chamber.

10. The apparatus of claim 2 wherein said buckle is initially spaced from said anchor a first distance prior to expansion of said expansible chamber and a second distance which is less than the first distance after expansion of said expansible chamber.

11. An apparatus for tensioning a vehicle seat belt and tightening the seat belt against a vehicle occupant, said apparatus comprising:

a buckle connectable with a tongue of a seat belt;

an anchor connectable with a part of a vehicle;

a housing fixed to one of said buckle and said anchor, said housing including a first wall and having a rectangular inner periphery taken in a plane extending normal to a longitudinal axis of said housing;

a second wall in said housing and cooperating with said first wall to define opposite ends of an expansible chamber, one of said first and second walls being movable relative to the other of said first and second walls, said second wall having a rectangular outer periphery taken in the plane;

a connector fixed to said second wall and to one of said buckle and said anchor, said connector extending through said first wall; and actuatable means in fluid communication with the expansible chamber for applying, upon actuation, a fluid pressure force against said first and second walls to expand said expansible chamber for tensioning the seat belt and tightening the seat belt against the occupant.

12. The apparatus of claim 11 wherein said second wall is connected with said anchor, said housing and said first wall are movable relative to said second wall in response to actuation of said actuatable means.

13. The apparatus of claim 12 wherein said actuatable means is fixed to said housing and moves with said housing.

14. The apparatus of claim 11 wherein said second wall is connected with said buckle by said connector, said second wall being movable relative to said housing in response to actuation of said actuatable means.

15. The apparatus of claim 14 wherein said actuatable means is fixed to one of said second wall and said connector, said actuatable means being movable with said one of said second wall and said connector.

16. The apparatus of claim 14 wherein said actuatable means is fixed to said housing.

17. The apparatus of claim 11 further including a gasket fixed to said second wall for engaging said housing to seal the chamber.

18. The apparatus of claim 11 further including means for inhibiting contraction of the expansible chamber after expansion of the expansible chamber.

19. The apparatus of claim 18 wherein said inhibiting means is located in the chamber.

20. The apparatus of claim 11 wherein said second wall and said housing cooperate to define a contractible chamber on a side of said second wall opposite said expansible chamber and further including an opening through said housing to vent said contractible chamber.

21. An apparatus for tensioning the seat belt and tightening the seat belt against a vehicle occupant, said apparatus comprising:

a buckle connectable with a tongue of a seat belt;

an anchor connectable with a part of a vehicle;

a housing fixed to said buckle, said housing including a first wall;

a second wall fixed to said anchor by a connector, said second wall located in said housing opposite said first wall, said first and second walls being relatively movable, said first and second walls cooperating with said housing to define an expansible chamber, said connector extending through said first wall;

actuatable means in fluid communication with the expansible chamber for applying, upon actuation, a fluid pressure force against said first and second walls to expand the expansible chamber for tensioning the seat belt and tightening the seat belt against a vehicle occupant;

each of said housing and said second wall having a rectangular periphery taken in a plane extending normal to a longitudinal axis of said housing.

22. The apparatus of claim 21 further including a gasket fixed to said second wall to prevent fluid flow between said second wall and said housing.

23. The apparatus of claim 21 wherein said second wall comprises a piston connected to said anchor by a cable.

24. The apparatus of claim 21 wherein said second wall comprises a plate formed in one piece with said anchor, said plate extending in a direction transverse to a plane containing said anchor.

25. The apparatus of claim 21 further including means in the expansible chamber for inhibiting contraction of the expansible chamber.

26. An apparatus for tensioning the seat belt and tightening the seat belt against a vehicle occupant, said apparatus comprising:

a buckle connectable with a tongue of a seat belt;

an anchor connectable with a part of a vehicle;

a housing fixed to said anchor, said housing including a first wall;

a second wall fixed to said buckle by a connector, said second wall located in said housing opposite said first wall, said first and second walls and said housing defining an expansible chamber, said connector extending through said first wall;

said housing and said second wall having respective rectangular peripheries taken in a plane extending normal to a longitudinal axis of said housing; and actuatable means in fluid communication with the expansible chamber for applying, upon actuation, a fluid pressure force against said first and second walls to expand said expansible chamber and tension the seat belt and tighten the seat belt against a vehicle occupant.

27. The apparatus of claim 26 further including means for inhibiting contraction of the expansible chamber after expansion of the expansible chamber.

28. The apparatus of claim 26 wherein said actuatable means is supported by one of said second wall and said connector.

29. The apparatus of claim 26 wherein said actuatable means is supported by one of said housing and said first wall.

* * * * *